（12） United States Patent
Ruh et al.

(10) Patent No.: US 9,174,291 B2
(45) Date of Patent: Nov. 3, 2015

(54) APPARATUS AND METHOD FOR MANUFACTURING THICK-WALLED HOLLOW WHEELS HAVING AN INTERNAL GEAR TOOTHING

(71) Applicant: ERNST GROB AG, Mannedorf (CH)

(72) Inventors: Fabian Ruh, Wald (CH); Daniel Deriaz, Meilen (CH)

(73) Assignee: ERNST GROB AG, Mannedorf (CH)

( * ) Notice: Subject to any disclaimer, the term of this patent is extended or adjusted under 35 U.S.C. 154(b) by 185 days.

(21) Appl. No.: 13/803,230

(22) Filed: Mar. 14, 2013

(65) Prior Publication Data

US 2013/0287513 A1 Oct. 31, 2013

(30) Foreign Application Priority Data

Apr. 25, 2012 (CH) ...................................... 0569/12

(51) Int. Cl.
*B21J 5/12* (2006.01)
*B23F 1/00* (2006.01)
*B21K 1/30* (2006.01)
*B21J 5/00* (2006.01)

(52) U.S. Cl.
CPC . *B23F 1/00* (2013.01); *B21J 5/008* (2013.01); *B21J 5/12* (2013.01); *B21K 1/30* (2013.01); *Y10T 409/109063* (2015.01)

(58) Field of Classification Search
CPC ........ B21H 5/025; B21D 22/16; B21D 22/18; B21D 53/28; B21D 22/14; B21D 31/06; B21J 5/008; B21J 5/12; B21K 1/30
See application file for complete search history.

(56) References Cited

U.S. PATENT DOCUMENTS 7,331,206 B2 * 2/2008 Aoyama ........................ 72/91
2006/0272375 A1 12/2006 Tittmann

FOREIGN PATENT DOCUMENTS

| DE | 102009045251 | 4/2010 |
| EP | 1621269 | 2/2006 |
| WO | 2005/075127 | 8/2005 |
| WO | 2005075127 | 8/2005 |
| WO | 2008139323 | 11/2008 |

* cited by examiner

*Primary Examiner* — Debra Sullivan
(74) *Attorney, Agent, or Firm* — Rankin, Hill & Clark LLP

(57) ABSTRACT

A method for manufacturing a hollow wheel equipped with an internal gear toothing, wherein a work-piece includes a tubular section with a longitudinal axis, by which the term radial utilized in the following is defined. By N≥2 stamping tools, of which each one during the implementation of the method is brought into a working position, the tool for producing the gear toothing is processed on the inside of the tubular section, wherein the work-piece carries out a rotating movement with a rotation speed varying in time around the mentioned longitudinal axis and at least one stamping tool in the working position carries out radially oscillating movements, which are synchronized with the mentioned rotating movement. The at least one stamping tool in the working position processes the work-piece repeatedly.

22 Claims, 5 Drawing Sheets ing position, when one and the same at least one stamping tool is in the working position, a periodical processing of the work-piece takes place. Therefore

APPARATUS AND METHOD FOR MANUFACTURING THICK-WALLED HOLLOW WHEELS HAVING AN INTERNAL GEAR TOOTHING

TECHNICAL FIELD

The invention relates to the field of manufacturing gear toothings of hollow wheels, in particular to corresponding internal toothings. Gear toothings and in particular involute toothings find application in toothed gearings and in particular in planetary gears, for example in those of automatic transmissions for automobiles, also, however, in other fields of vehicle building and machine construction. The invention relates to methods and apparatuses in accordance with the preamble of the independent claims.

PRIOR ART

Today, internal gear toothings are manufactured above all by metal removing methods, in particular by reaming.

Broaching is also utilised for the manufacturing of toothed hub profiles such as internal toothings according to DIN 5480, DIN 5482, etc.

If pot-shaped work-pieces shall be provided with a gear toothing by broaching, first of all in a component corresponding to the pot wall the gear toothing has to be manufactured and thereafter, this component has to be joined to a pot bottom part, for example by means of laser—or electron beam welding.

If a gear toothing shall to be manufactured in a work-piece shaped like a pot by machining (metal removing), shaping is utilised, which compared to broaching, however, comprises a lower efficiency.

For mechanically low loaded components the production of internally toothed hollow wheels by sintering is an alternative, which in addition enables the forming of pot-shaped hollow wheels as a single part, without a subsequent connection step for the pot bottom and wall having to take place.

It is desirable to create an alternative method for the manufacturing of internal gear toothings.

For the manufacture of internal plug-in profiles, cold-forming methods are known, in which an externally profiled mandrel is introduced into a hollow cylindrical work-piece, and thereupon an internal profiling of the work-piece corresponding to the profiling of the mandrel is produced by cold-working the work-piece from the outside by means of planet-like driven unprofiled tools periodically impinging on the work-piece. Methods of this kind are known, for example from DE 37 15 393 C2, CH 670 970 A5, CH 675 840 A5, CH 685 542 A5 and EP 0 688 617 B1.

A production of internal gear toothings by cold forming is difficult to implement, because gear toothings at least in comparison with plug-in profiles comprise significantly greater tooth heights and apart from this in general have higher accuracy requirements.

A method for producing an internal—and external profiling in thin-walled cylindrical hollow parts is described in WO 2007/009267 A1. The thin-walled hollow component is seated on an externally profiled mandrel and is processed by cold forming by at least one profiling tool acting in an impacting manner on the hollow part from outside. In doing so, the profiling tool is moved vertically to the surface, therefore radially, and the hollow part is axially displaced relative to the profiling tool with a radial feed depth remaining constant. By means of this process the profiling predefined by the profiling mandrel can be transferred to the internal gearing and the corresponding external gearing of the thin-walled hollow part. For producing an internal gear toothing the method is completely unsuitable, because it can only be utilised in case of thin-walled sheet metal components, by which, however, neither an adequate accuracy nor a high load-bearing capacity are capable of being achieved.

DESCRIPTION OF THE INVENTION

It is an object of the invention to create an alternative method, by which internal gear toothings can be produced. Furthermore an apparatus for the production of internal gear toothings and a use of the apparatus shall be created, as well as a gearing which comprises a hollow wheel with an internal gear toothing.

It is a further object of the invention to create a possibility of producing internal gear toothings with a high accuracy.

A further object of the invention is to create a possibility of producing internal gear toothings with a high efficiency, therefore to achieve short processing times when producing internal gear toothings.

A further object of the invention is to create a possibility to produce internal gear toothings with great gearing depths. Gear toothings with slender teeth shall be creatable, in the case of which the gearing depth of the gear tooting is at least 2.2 times as great as the module of the gear toothing.

A further object of the invention is to create a possibility to produce internal gear toothings in hollow wheels with great residual wall thicknesses.

A further object of the invention is to create a possibility to produce internal gear toothings in pot-shaped hollow wheels, in particular ensuring a precise alignment of the pot bottom relative to the gearing.

A further object of the invention is to create a possibility to produce internal helical gearings.

A further object of the invention is to create gearings, which comprise at least one hollow wheel with an internal gear toothing, wherein the gear toothing shall be particularly efficiently produceable or of particularly high precision.

At least one of these objects is at least partially achieved by an apparatus, a method and a gearing in accordance with the claims.

The method for producing a hollow wheel equipped with an internal gear toothing comprises that a work-piece, which comprises a tubular (or tube-like) section with a longitudinal axis, through which the term radial utilised in the following is defined, is processed on the inside of the tubular section by N≥2 stamping tools, of which each one during carrying out the method is brought into a working position, for the creation of the gear toothing in that the work-piece carries out a rotating movement about said longitudinal axis with a rotation speed varying with time and the respective at least one of the stamping tools in the working position carries out radially oscillating movements, which are synchronised with said rotating movement, so that said at least one stamping tool in the working position processes the work-piece repeatedly, in particular periodically.

By the mentioned longitudinal axis the terms "radial" and "axial" utilised in the following are defined.

In doing so, stamping tools may in particular be separate stamping tools.

Typically the work-piece is repeatedly processed one after the other by the respective at least one stamping tool in the working position. And typically, as long as one and the same at least one stamping tool is in the working position, a periodical processing of the work-piece takes place. Therefore the work-piece is typically at least in sections periodically processed during the implementation of the method.

The processing of the work-piece is typically a stamping reforming or hammering reforming machining.

The rotating speed of the work-piece varying over time produces successive phases of relatively higher rotating speeds and relatively lower rotating speeds, wherein in particular it may be provided, that the work-piece during the phases of the relatively lower rotating speeds at least momentarily reaches the (rotation-) standstill (rotation standstill also has a rotating speed, namely zero). The processing of the work-piece by a stamping tool normally takes place during one of the phases of relatively lower rotating speed. The slower the work-piece rotates during the intervention of the corresponding stamping tool, resp., the longer the work-piece during the phases of relatively low rotating speed rotates or stands still, the better it is possible to achieve a high precision of the finally produced gear toothing.

The rotating speed of the work-piece varying over time normally is an at least in sections periodically varying rotating speed.

A stamping tool in the working position periodically interacting with the work-piece describes a radially oriented stroke movement running forwards and backwards, by which the work-piece is processed by cold re-forming, this in a multitude of individual stamping steps. In doing so, two or more stamping tools are utilised successively. The gearing is produced in the work-piece by cold re-forming; there is, except in possibly subsequently carried out calibration steps, no chip removal.

During the periods of relatively lower rotating speed of the work-piece, the work-piece is re-formed, and while the work-piece rotates with a relatively higher rotating speed, all N stamping tools, which also may be designated as indenting tools or stamps, are at such a distance from the work-piece, that it can rotate without being prevented from doing so by one of the stamping tools.

In one embodiment the hollow wheel is a hollow gearwheel.

In one embodiment at least two of the N stamping tools comprise differently shaped working sections. In this it may in particular be provided, that Each of the N stamping tools comprises a differently shaped working section; or M≥2 is a whole number with N=2M, and the N stamping tools form M pairs of stamping tools with essentially identically shaped working sections, and the working sections of different ones of the M pairs of N stamping tools are differently shaped.

In the first case, during a period of the oscillating movement typically exactly one intervention of one of the stamping tools on the work-piece takes place, whereas in the second mentioned case, during one period of the rotating movement typically precisely two interventions of stamping tools on the work-piece take place, namely respectively one intervention by each one of the two stamping tools of the respective one of the M pairs of stamping tools, wherein these typically are arranged along one and the same radially aligned axis.

In one embodiment, which may be combined with the previously mentioned embodiment, the different working sections of the stamping tools differ in the respective length in radial direction, measured in the working position. In doing so, it is possible that a temporal sequence, in which the stamping tools are brought into the working position, is given by the sequence resulting when the N stamping tools are sorted in a rising sequence in accordance with the mentioned length.

To that extent the stamping tools may also be understood as step tools.

In an embodiment, which may be combined with one or more of the embodiments mentioned before, it is provided, that either a) exactly one of the stamping tools (which may be designated as the Nth stamping tool) comprises a working region, the gearing profile of which
  a1) essentially corresponds to the profile of the gearing gap of the gear toothing to be produced; or
  a2) corresponds essentially to the profile of two adjacent gearing gaps (and therefore also of the gearing tooth in between) of the gear toothing to be produced;
 wherein each one of the further stamping tools either
  a3) comprises a working region, the gearing profile of which essentially corresponds to the profile of a gearing gap of the gear toothing to be produced, but in radial direction (measured in the working position) comprises a smaller length; or
  a4) essentially corresponds to the profile of two adjacent gearing gaps (and therefore also of the gearing tooth in between) of the gear toothing to be produced, but in radial direction (measured in the working position) comprises a smaller length;

or b) M≥2 is an integral number with N=2M and the N stamping tools form M pairs of stamping tools with essentially the same shaped working regions, wherein the working regions of the stamping tools comprise exactly one of the M pairs of N stamping tools (which may be designated as the Mth pair of stamping tools) comprise a gearing profile, which
  b1) essentially corresponds to the profile of a gearing gap of the gear toothing to be produced; or
  b2) essentially corresponds to the profile of two adjacent gearing gaps (and therefore also of the gearing tooth in between) of the gear toothing to be produced
 and wherein the stamping tools of each one of the further pairs of stamping tools comprise a gearing profile, which
  b3) comprises a working region, the gearing profile of which essentially corresponds to the profile of a gearing gap of the gear toothing to be produced, but in radial direction (measured in the working position) comprises a smaller length; or
  b4) essentially corresponds to the profile of two adjacent gearing gaps (and therefore also of the gearing tooth in between, but in radial direction (measured in the working position) comprises a smaller length.

In the case of a) (or more specifically a3), resp., a4)) it may in particular be provided, that the mentioned length in the case of the n-th stamping tool, $1 \le n \le N-1$, essentially corresponds to n/N—times the gearing tooth depth of the gear toothing to be produced. The lengths of the stamping tools are uniformly stepped in this case.

And in the case of b) (or more specifically b3), resp., b4)) it may in particular be provided, that the mentioned length in the case of the stamping tools of the m-th pair of stamping tools, $1 \le m \le M-1$, essentially corresponds to m/M—times the gearing tooth depth of the gear toothing to be produced. The lengths of the stamping tools of the pairs of stamping tools are then accordingly uniformly stepped.

The stamping tools described in a3), b3), a4), b4) may be stumps of the stamping tools described in a1) or a2) or b1) or b2).

For example the shape of the stamping tools described in a3), resp., b3) and a4), resp., b4) may be produced by cutting off from one of the stamping tools described in a1) or b1), resp., in a2) or b2) a part (in the area of the tool head, resp., the tool heads of the stamping tools) and this by a cut along a plain, which, when the stamping tool is in the working position, stands vertically on a radial direction centrally through the stamping tool. In doing so, the cutting surface, resp., the cutting surfaces do not have to be flat, but may be cambered, and/or the cutting edges may be rounded.

The stamping tools described in a1), a3), b1) or b3) may be understood and designated as single toothed stamping tools, and the stamping tools described in a2), a4), b2) or b4) may be understood and designated as double toothed stamping tools.

The methods described in a) may be understood and designated as single stroke methods, and die methods described in b) may be understood and designated as double stroke methods. In single stroke methods, per period of the oscillating movement precisely one intervention of a stamping tool into the work-piece takes place, and in the working position there is also only a single stamping tool. In the double stroke method, however, per period of the oscillating movement precisely two interventions into the work-piece take place, namely exactly one per each one of the stamping tools of a pair of stamping tools, and in the working position there are then both stamping tools of a pair of stamping tools. In the double stroke method it is possible to achieve a particularly high manufacturing speed. Single stroke methods are implementable more simply with respect to tools required.

Typical tool combinations are:
all N stamping tools are single toothed;
all N stamping tools are double toothed;
in the case of the single stroke method precisely one stamping tool is double toothed, and N−1 stamping tools are single toothed;
in the case of the double stroke method precisely two stamping tools, namely one pair of the M pairs of stamping tools, are double toothed, and N−2 stamping tools, namely the stamping tool of M−1 pairs of stamping tools, are single toothed.

In one embodiment, which may be combined with one or more of the above mentioned embodiments, at least one of the N stamping tools comprises a working region, the tooth profile of which essentially corresponds to the profile of two adjacent tooth gaps (and therefore also of the tooth in between) of the gear toothing to be produced (previously referred to as double-toothed stamping tool). In particular each one of the N stamping tools may comprise a working region, which comprises the mentioned tooth profile.

In an embodiment, which may be combined with one or more of the previously mentioned embodiments, the N stamping tools are held by a tool holder. In particular the tool holder may be driven to a movement, by which the stamping tools are capable of being brought into the working position. With this it is possible to achieve in a simple and automatable manner, that a rapid changing of the stamping tools processing the work-piece to take place. With this it is possible to achieve short processing times.

The tool holder may be driven to radially oscillating movements, on the basis of which stamping tools in the working position are able to carry out the mentioned radially oscillating movement. As a result it is possible in a relatively simple manner to achieve an automatable and rapid work-piece processing.

The tool holder may also comprise a drum, on the circumference of which the stamping tools are arranged. A tool holder or a drum of this kind may be designated as a revolver. A drum of this kind may be rotatable, so that by a rotating movement of the drum, stamping tools can be brought into the working position. In particular the drum may be rotatable around a rotation axis parallel to the longitudinal axis, in particular in an intermitting manner (with relatively long standstill phases versus the phases of the rotating movement). The N stamping tools may be uniformly or non-uniformly distributed around the circumference of the drum.

Additionally or alternatively it is possible for the tool holder to comprise a rod- or beam-shaped part, on which stamping tools are arranged one behind the other. In particular it may be provided, that the N stamping tools form exactly one row (particularly in the case of a single stroke method) or form exactly two rows arranged on opposite sides of the rod- or beam-shaped part (this in particular in the case of a double stroke method). The one or two rows of stamping tools may in particular run parallel to the longitudinal axis. Typically it is possible to displace the rod- or beam-shaped part parallel to the longitudinal axis, so that by this it is possible to get stamping tools into the working position.

In an embodiment, which may be combined with one or more of the previously mentioned embodiments, the mentioned at least one stamping tool in the working position processes the work-piece in those phases of the rotating movement, in which the work-piece at least momentarily is standing still. In particular the rotating movement of the work-piece may be an intermitting rotation, and the mentioned at least stamping tool in the working position processes the work-piece in the phases of rotation standstill of the work-piece. The at least one stamping tool is then therefore during the phases of standstill of the intermitting work-piece rotating movement acting on the work-piece. It has to be remarked, that an intermitting rotation comprises, that in between phases of the rotation there are phases of rotation standstill, wherein phases designate time durations, by which standstill phases differ from momentary standstill. Normally it is then provided, that within the time periods of the rotation standstill the work-piece is re-formed, and that during the rotation of the work-piece all N stamping tools are at such a distance from the work-piece, that it is possible for the work-piece to rotate, without being prevented from doing so by one of the stamping tools.

In one embodiment, which may be combined with or more of the previously mentioned embodiments, it is provided, that
c) initially, a first one of the N stamping tools is brought into the working position and then on after the other the further ones of the N stamping tools are, up to the N-th stamping tool, wherein each one of the N stamping tools remains in the working position at least for as long as every gearing tooth gap of the gear toothing to be produced has been processed at least once, in particular at least twice, by the respective stamping tool, which is in the working position, in particular wherein all of the N stamping tools comprise differently shaped working regions;
or
d) M≥2 is an integral number with N=2M, and the N stamping tools form M pairs of stamping tools with working regions essentially formed the same way, and initially a first pair of the M pairs of stamping tools is brought into the working position and then, one after the other, the further M pairs of stamping tools are, up to the M-th pair of the stamping tools, wherein every one of the M pairs of the stamping tools remains in the working position at least for as long as it takes for every tooth gap to be created has been processed at least once, in particular at least twice by at least one of the two, in particular by both of the stamping tools in the working position of the respective pair of stamping tools, in particular wherein all of the M pairs of stamping tools comprise differently shaped working regions.

In general, case c) concerns a single stroke method and case d) a double stroke method.

Typically it is provided, that the N stamping tools during carrying out the method with respect to their radial coordinate are arranged within the radial coordinates defined by the inside of the tubular section.

In one embodiment, which may be combined with one or more of the previously mentioned embodiments, it is provided, that N≥4 is applicable and all of the N stamping tools comprise differently shaped working regions; or M≥3 is an integral number with N=2M and the stamping tools form M pairs of stamping tools with essentially identically shaped working regions.

Typically, in case of single stroke methods 3≤N≤10 is applicable, and in case of double stroke methods 3≤M≤8.

In one embodiment, which may be combined with one or several of the previously mentioned embodiments, the hollow wheel is a hollow geared wheel.

In one embodiment, which may be combined with one or more of the previously mentioned embodiments, the hollow wheel is a thick-walled hollow wheel. We designate a geared hollow wheel as thick-walled, when the residual wall thickness of the hollow wheel is at least 0.25 times as big as the gearing depth, resp., in a tighter sense at least 0.5 times as big as the gearing tooth depth. The gearing tooth depth is the distance between foot circle and head circle, and the residual wall thickness indicates the remaining wall thickness at a gear tooth bottom up to the external surface of the gear wheel.

In one embodiment, which may be combined with one or more of the previously mentioned embodiments, the hollow wheel comprises a residual wall thickness, which is at least a big as the gearing depth of the gear toothing tooth depth.

In one embodiment, which may be combined with one or several of the previously mentioned embodiments, the gear toothing is a helical gearing with a helix angle β with |β|>0°. In this case, the gear toothing extends accordingly at an angle to the longitudinal axis. In particular it may be applicable for the helix angle: 40°≥|β|≥5°.

Alternatively the gear toothing may be a straight gearing, therefore extending parallel to the longitudinal axis (β=0°).

In one embodiment, which may be combined with one or more of the previously mentioned embodiments, the hollow wheel is pot-shaped (or pot-like), with a tubular section following the bottom part. In particular the tubular section may be integrally formed with the bottom part. In case of machining methods known from prior art in general first a tubular work-piece is provided with the gearing and subsequently joined with the bottom part, for example, by welding. This entails not only a further manufacturing step, but also aligning and adjusting problems, which bears the danger of an insufficiently precise alignment of the bottom part to the gearing. When utilising a method according to the invention, however, a one-piece work-piece may be provided, which renders following steps of this kind superfluous.

In one embodiment with a pot-shaped hollow wheel a recess is provided between the bottom part and the gearing section, i.e. a section with a recess, which radially extends up to beyond the head circle diameter of the gear toothing.

A pot-shaped hollow wheel, resp., a corresponding work-piece may for certain applications comprise (at least) one hole in the bottom part.

In one embodiment, which may be combined with one or more of the previously mentioned embodiments, the gearing tooth depth is at least 2.0 times, in particular at least 2.4 times as big or even 2.5 times as big as the module of the gear toothing. Such great gearing tooth depths, resp., corresponding so-called high gearings are well manufacturable with the described method, but in other cold forming methods, however, create great problems in manufacturing. Great gearing depths enable a high covering degree, which makes the corresponding hollow wheels especially capable of bearing high loads.

Meant with the "module", if nothing else is indicated, is the face module or front module.

In one embodiment, which may be combined with one or more of the previously mentioned embodiments, the gear toothing has a module of between 0.5 and 8, in particular between 1 and 5 and/or a module of at least 1.25.

In one embodiment, which may be combined with one or more of the previously mentioned embodiments, the gear toothing comprises a reference circle diameter and a toothed length, to which applies, that the reference circle diameter is at least twice and at most 20 times the size, in particular at least 3 times and at most 15 times or at least 4 times and at most 10 times the gearing length.

It is known, that for the face module $m_s$: $m_s=Td/p$ is applicable, wherein Td designates the reference circle diameter and p the number of gear teeth of the gear toothing. And applicable for the face module is $m_s$: $m_s=t/\pi$, wherein π designates the circle number and t the pitch (face pitch) of the gearing.

In one embodiment, which may be combined with one or more of the previously mentioned embodiments, by the described processing of the work-piece no external in the work-piece no external gearing corresponding to the gear toothing is produced.

In one embodiment, which may be combined with one or more of the previously mentioned embodiments, the hollow wheel does not comprise an external gearing, in particular no external gearing corresponding to the internal gearing.

In one embodiment, which may be combined with one or more of the previously mentioned embodiments, when producing the gear toothing no mandrel is utilised, in particular no mandrel, which comprises a profiling corresponding to the gearing to be produced.

In one embodiment, which may be combined with one or more of the previously mentioned embodiments, the work-piece is held in a work-piece receiver, which comprises an external surface essentially rotationally symmetrical with respect to the longitudinal axis, in particular an essentially cylindrically shaped external surface. In particular the work-piece during the periodical processing by the stamping tools may be received in the work-piece receiver. Alternatively, however, it is also possible, that the work-piece is not received in a work-piece receiver; also in this case the work-piece may be rotated, normally by means of a tool holder.

In one embodiment to be combined with the last mentioned embodiment, the work-piece receiver is shaped essentially ring-shaped, resp., hollow cylindrically or pot-shaped.

In one embodiment to be combined with one of the two the last mentioned embodiments, the work-piece receiver is designed as a clamping device for the work-piece.

In one embodiment, which may be combined with one or more of the previously mentioned embodiments, at least one counter-holder is provided. By means of a counter-holder, forces, which result from an intervention on the work-piece by the stamping tool acting on the work-piece, in particular radially acting forces, are absorbed, so that the work-piece during the interventions by the stamping tool essentially remains in the same place. During the tool interventions the at least one counter-holder is in contact with the work-piece or respectively with the work-piece receiver, and in preference with no play; while the work-piece is rotated, the work-piece (resp., if so applicable the work-piece receiver) and counter-holder are preferably at a distance from one another, in particular, however, may then also lie against the work-piece (resp., the work-piece receiver). Typically a stamping tool in the working position is brought to the stamping intervention with the work-piece by means of a tensile force.

The utilisation of shearing or transverse forces, however, is also possible. In the case of double stroke methods, in general alternatingly tensile forces and shearing or transverse forces are utilised, e.g., when an x-direction runs radially, in +x-direction tensile forces and in −x-direction shearing or transverse forces may be utilised.

In the single stroke method typically at least one or exactly one counter-holder is provided, while in double stroke methods typically at least two or exactly two counter-holders are provided, wherein in particular two counter-holders may be provided, which are positioned opposite one another in an essentially mirror-inverted fashion relative to the longitudinal axis.

In general, one counter-holder is essentially fixed during the intervention.

In one embodiment with at least one counter-holder, the counter-holder is formed adapted to the external shape of the work-piece or to the external shape of a work-piece holder, in which the work-piece is held (adapted with respect to its shape).

In one embodiment, which may be combined with the last mentioned embodiment, every one of the described counter-holders does not comprise a profile corresponding to that to be provided to the work-piece.

In one embodiment, which may be combined with one or more of the previously mentioned embodiments, and in which the work-piece is held in a work-piece holder, the work-piece holder does not comprise a profile corresponding to the profile of the gear toothing to be produced in the work-piece.

In one embodiment, which may be combined with one or more of the previously mentioned embodiments, the method is implemented in such a manner, that in a multitude of rotations of the work-piece, by the periodical processing of the work-piece by the stamping tools, a deeper and deeper formation of the tooth gaps of the gear toothing is obtained, until a pre-defined gearing depth and shape is achieved. If such a method is utilised, following the described processing steps by the stamping tools, in general no subsequent further steps for calibrating or re-forming of the gearing have to be implemented.

In one embodiment, which may be combined with one or more of the previously mentioned embodiments, the work-piece relative to the gearing surface of the gear toothing is concave, typically in the area of the internal surface processed by the stamping tools.

In one embodiment, which may be combined with one or more of the previously mentioned embodiments, the stamping tools, in the gearing direction (direction of extension of the gearing gaps), are longer than the gearing gaps of the gear toothing. This of course refers to the operating area of the stamping tool, and thus to the area of the stamping tool, which intervenes in the work-piece, thus coming into a (re-forming) contact with it. This can contribute to ensuring that the gear toothing is established with high precision over its whole length.

In one embodiment, which may be combined with one or more of the previously mentioned embodiments, it is provided, that each one of the stamping tools comprises a working region, which comprises at least one tool head and tool flanks, and wherein one tool head of one of the stamping tools, in particular of all N stamping tools, is convex shaped. A single tooth stamping tool comprises a tool head and two adjacent tool flanks. A double-tooth stamping tool comprises two tool heads each with two adjacent flanks. The provision of bossed stamping tools may contribute to ensure, that the gear toothing is produced with high precision over its whole length. The bossed shape may be provided in radial direction. In particular a tool head may describe a convex shape in a section symmetrically between adjacent tool flanks, in particular describe an elliptical section (wherein a circle section is also an elliptical section).

In one embodiment, which may be combined with one or more of the previously mentioned embodiments, the method is implemented in such a manner, that in a multitude of turns of the work-piece, by the periodical processing of the work-piece by the stamping tools, a continuing formation of the tooth gaps in the gearing direction is effected, until a pre-defined geared length of the gear toothing is achieved. During carrying out such a method, the teeth and tooth gaps of the gear toothing to be produced therefore extend ever further in the direction of a coordinate parallel to the longitudinal axis (wherein the tooth gaps in case of a helical gearing of course do not extend parallel to the longitudinal axis). The gearing length of the gear toothing therefore in the course of the implementation of such a method becomes longer, until the prescribed geared length has been reached. For example, at one end of the tubular section one begins with a first stamping tool or pair of stamping tools and the work-piece is processed successively up to the opposite end of the tubular section, and thereafter again at one end of the tubular section one begins, however, with a second stamping tool or pair of stamping tools, and the work-piece is successively processed up to the opposite end of the tubular section, until all N stamping tools have been utilised and the gear toothing has been completed to its full depth and full length. Typically the at least one stamping tool in the operating position and the work-piece (during the rotation movement of the work-piece and during the radially oscillating stamping tool movement) are moved in axial direction relative to one another. The relative movement of work-piece and stamping tool(s) therefore (for every stamping tool in the working position) describes a screw-shaped spatial curve superimposed by the radially oscillating movement of the mentioned stamping tool.

In one embodiment, which may be combined with one or several of the mentioned embodiments, the hollow wheel is a component of a gearing, in particular of a vehicle automatic transmission. The gearing in general also comprises several planetary wheels, which interact with the hollow wheel.

Methods of the type described above may be utilised for producing a hollow wheel of a gearing, in particular of a vehicle automatic transmission.

In the methods for producing a gearing comprising a hollow wheel equipped with an internal gear toothing, the hollow wheel is produced in accordance with one of the preceding methods. The gearing in general also comprises at least one planetary wheel, typically at least two planetary wheels, which operates, resp., interacts with the hollow wheel.

The method for producing hollow wheels equipped with an internal gear toothing comprises:
  A work-piece holder rotatable about its longitudinal axis for holding a work-piece with a tubular section aligned along the longitudinal axis in such a manner, that the tubular section can be processed on its internal side;
  A drive for the rotation of the work-piece holder, which is designed to produce a rotation with a rotating speed variable over time, in particular an intermitting rotation;

A work-piece holder for holding N≥2, in particular N≥4 stamping tools, by means of which each one of the N stamping tools may be brought into a working position, and which can be driven for implementing a linearly oscillation movement extending radially to the longitudinal axis, so that the tubular section on its internal side can be processed repeatedly by a stamping tool in the working position, in particular processed periodically;

A synchronisation device for a synchronisation of a rotation of the work-piece holder with the linearly oscillating movement of the work-piece holder extending radial to the longitudinal axis.

In particular the apparatus may comprise N stamping tools.

The stamping tools serve for the periodical acting on the work-piece, so that the producing of the gear toothing can take place separated into a multitude of individual stamping processes. Furthermore, differently designed stamping tools may serve to divide the step-by-step deepening penetration of the stamping tools into further stages.

In order to render the work-piece capable of being processed on its internal side, the work-piece is held in such a manner, that the internal surface of the work-piece is accessible for this processing by the stamping tools.

In one embodiment the drive for the rotation of the work-piece holder is a torque motor.

In one embodiment the work-piece holder comprises a work-piece receiver for receiving a work-piece, which in particular comprises an external surface essentially rotationally symmetrical with respect to the longitudinal axis. For example, this external surface may be essentially cylindrically designed. The work-piece receiver, for example, may be designed essentially ring-shaped, hollow cylindrically or pot-shaped.

In one embodiment the apparatus comprises at least one counter-holder, which interacts with the work-piece (and if so required with the work-piece receiver) in such a manner, that by it forces are absorbed, which are exerted on the work-piece holder by stamping tools. Typically this concerns mainly such forces or force components, which essentially act radially.

In one embodiment, which may be combined with one or more of the previously mentioned apparatus embodiments, the work-piece holder is displaceable along the longitudinal axis. In this case a drive may be provided for the corresponding longitudinal displacement of the work-piece holder.

Furthermore, advantageously, a drive for the linearly oscillating movement of the tool holder may be provided.

The invention furthermore comprises apparatuses with features, which correspond to the features of described methods and vice-versa also methods with features, which correspond to the features of described apparatuses.

The advantages of the apparatuses correspond to the advantages of the corresponding methods and vice-versa.

Furthermore a use of one of the apparatuses described above is disclosed, namely a use of such an apparatus for the production of an internal gear toothing in a hollow wheel. In particular such an apparatus may be utilised for the production of an internal gear toothing in a hollow wheel of a gearing, in particular of a motor vehicle automatic transmission.

The gearing comprises a hollow wheel comprising an internal gear toothing the internal gear toothing of which is produced by one of the methods described above, in particular wherein the gearing is an automatic transmission for a motor vehicle.

Gear toothings produced in accordance with the invention are characterized by high precision and great shape stability, wherein the latter essentially may be ascribed to the special cold forming processing, respectively, by the high material strength achieved thereby (in particular in the edge zone of the gearing). In addition, these gear toothings may be distinguished by a high surface quality, without any (significant, re-forming) post-processing being necessary. Also a hardening distortion, to which such a hollow wheel is subjected in case of the hardening by heat effect, is significantly lower than in the case of a hollow wheel, whose gear toothing has been produced by shaving.

Work-pieces are typically made of alloyed tempered steel (with typically at least 0.3% carbon content), which subsequently is inductively hardened or laser hardened, or made of alloyed case hardened steel (with typically at most 0.3% carbon content), which subsequently is typically hardened by gas nitration or nitro-carbonation.

The diameter (reference circle diameter) of a typical gear toothing is within the range of 50 mm to 450 mm, in particular in the range of 100 mm to 350 mm and often in the range of 200 mm to 300 mm.

The tolerances achievable by means of the method (of the gear toothing) typically correspond to the quality 8 or the quality 7 in accordance with DIN 3960.

The surface roughness of the gear toothing produced by the method in general is characterised by Ra-values (in accordance with DIN 4287) smaller or equal to 0.8 μm. In particular they mostly have Ra-values smaller than or equal to 0.6 μm, typically even in the range of 0.2 μm up to 0.6 μm.

Further embodiments and advantages emerge from the dependent claims and the Figures.

BRIEF DESCRIPTION OF THE DRAWINGS

In the following the object of the invention is described in more detail on the basis of exemplary embodiments and the enclosed drawings. These show.

Components not essential for understanding the invention are in part not illustrated. The described embodiments are exemplary for the object of the invention and have no limiting effect.

Ways for Implementing the Invention

Figure 1:
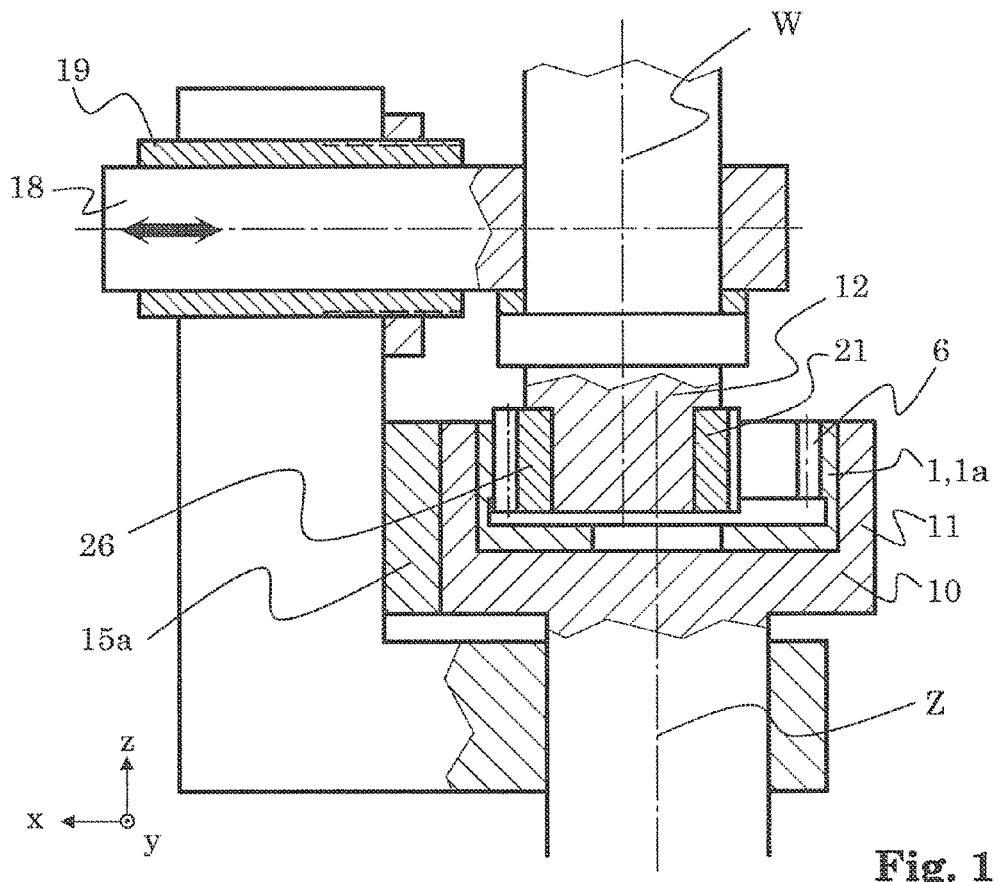
FIG. 1 A detail of an apparatus for manufacturing a hollow wheel with an internal gear toothing, in a partial section parallel to the longitudinal axis of the work-piece.
Figure 2:
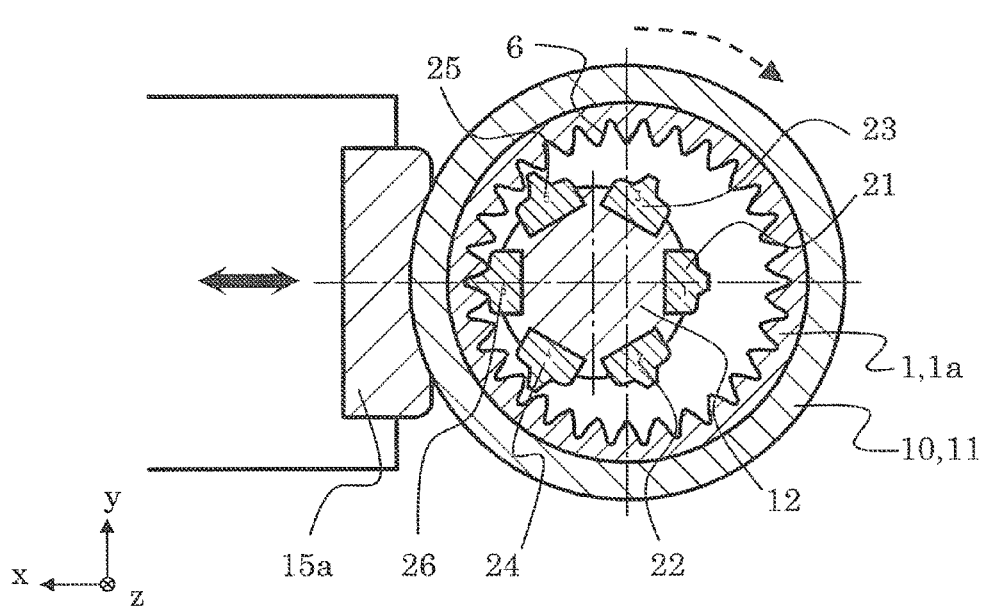
FIG. 2 a detail of the apparatus for manufacturing a hollow wheel with an internal gear toothing in accordance with FIG. 1, in a partial section vertical to the longitudinal axis of the work-piece.

FIGS. 1 and 2 respectively show a detail of an apparatus for producing a hollow wheel 1a equipped with an internal gear toothing, in a partial section parallel to the longitudinal axis of the work-piece (FIG. 1) resp. vertical (FIG. 2); the coordinates x, y, z are indicated in the Figures.

By means of the apparatus, a gear toothing may be provided in the work-piece 1, so that a hollow wheel 1a with a gear toothing 6 is produced. The work-piece 1 has a longitudinal axis Z, which during the processing coincides with one axis (rotation axis) of a work-piece holder 10 holding the work-piece 1, so that for simplicity's sake the corresponding axis in the following is also described as axis Z.

By a work-piece holder 12 several stamping tools 21, 22, . . . are held, by means of which a work-piece 1 may be periodically processed. For this purpose the work-piece holder 12 carries out an oscillating movement in x-direction (symbolised by the double arrow above left in FIG. 1). This is transmitted through a shaft 18, which is driven to an oscillating movement relative to a feed bushing 19. A stamping tool in the working position, in FIGS. 1 and 2 the stamping tool 26, in this manner repeatedly, in general periodically, comes into interaction with the work-piece. The work-piece 1 itself is rotated around the axis Z by means of the work-piece holder 10 with a varying rotation speed, in particular rotated in an intermitting manner (symbolised by the dashed arrow in FIG. 2). The oscillating movement of the tool holder 12, which corresponds to an oscillating movement of stamping tools in the working position, is synchronised with the rotation of the work-piece 1. The movements of work-piece 1 (resp., work-piece holder 10) and work-piece holder 12 are synchronised in such a manner, that during phases of minimum work-piece rotation speed (in case of an intermitting work-piece rotation: in phases of standstill of the intermitting rotation of the work-piece) the at least one stamping tool in the working position comes into interaction with the work-piece 1. In case of an intermitting work-piece rotation, the work-piece 1 can be rotated further (typically by one division), as soon as the work-piece holder 12 is displaced far enough (in x-direction), that the stamping tools 21, 22, . . . during the work-piece rotation do not come into contact with the work-piece 1. In the situation depicted in FIGS. 1 and 2, the work-piece 1 is rotated on as soon as the stamping tool 26 has been sufficiently run out of the developing tooth gap. In case of a non-intermitting work-piece rotation the speed profile (variation of the rotation speed over time) has to be selected correspondingly.

Thereafter—i.e. in case of an intermitting rotation within the next standstill phase—the at least one stamping tool in the working position again interacts with the work-piece 1, for the further production of the next tooth gap of the gear toothing 6 to be produced, and so on. The gear toothing 6 in this manner is produced by cold-forming by a successive implementation of a multitude of stamping steps. In doing so, however, in addition, differently shaped stamping tools are utilised successively.

Initially, in the manner described before, a first stamping tool 21 is utilised, so that at the location of the tooth gap to be produced, an indentation not yet reaching the final gearing depth to be obtained is produced, in that at least one tool intervention per tooth gap to be obtained takes place (typically, however, two or three), wherein in case of several tool interactions with the same stamping tool, an interaction at the same location normally only takes place, when in the meantime also all the other tooth gaps have been correspondingly pre-formed. The latter procedure in general achieves better results than if a work-piece intervention takes place at the same location, before the work-piece has been rotated on to the location of a further tooth gap to be produced.

When the processing by means of the first stamping tool 21 is finished, a second stamping tool 22 is brought into the working position. For this purpose, in the example of the FIGS. 1 and 2, the tool holder 12 may be rotated around a rotation axis W, which extends parallel to the axis Z. With this second stamping tool 22 then again, analogue to the procedure with the first stamping tool 21, every emerging tooth gap is processed once or several times. The procedure is followed analogously with possibly further stamping tools, in the example of FIGS. 1 and 2 with the stamping tools 23 to 26.

The feed bushing 19 may be displaced in radial direction (more precisely: in x-direction), and so enables the adjustment of the radial feed depth of stamping tools (in the working position), which on the one hand is recommended, when changing from one stamping tool to another stamping tool, and/or on the other hand, when one and the same stamping tool comes to intervene with the work-piece a further time, resp., when a location of a tooth gap to be produced tooth gap in the work-piece is processed again by a same shaped stamping tool. The feed bushing 19 may in particular be driven, which may contribute to an automatability of the method.

The shape of the last stamping tool (No. 26 in case of FIGS. 1 and 2) corresponds to the shape of the tooth gaps of the gear toothing 6 to be produced. The shape of the other stamping tools (No. 21 to 25 in FIGS. 1 and 2) is basically the same, they are, however, shortened in length (at the tool head), and the sequence of die interventions of the stamping tools takes place according to the increasing length of the corresponding stamping tool.

It is generally advisable, that every tooth gap is processed at least twice (or even three- or four-times) by a stamping tool ("last stamping tool"; No. 26 in case of FIGS. 1 and 2) having a shape corresponding to the shape of the tooth gaps of the gear toothing 6 to be produced. With this an especially high precision of the gear toothing may be achieved, and subsequent working steps may in most cases be unnecessary.

The stroke movement of the tool holder 12 for producing the oscillating movement of the stamping tools may be obtained by means of an eccentric cam. Alternatives for the eccentric cam, for example, are a crank drive or a shifting gate. The stamping of the work-piece by the stamping tools takes place by the application of tensile forces. It is, however, also conceivable that the arrangement is changed in such a manner, that tensile forces are used for the stamping. In case of double strike methods both tensile—as well as shearing or transverse forces may be applied and this alternatingly.

The work-piece holder 10, by which the rotation movement of the work-piece 1 is transmitted, in case of the example depicted in FIGS. 1 and 2 comprises a work-piece receiver 11, by means of which the work-piece is radially encompassed, wherein "radial" in the present patent application always relates to the axis Z, therefore designating directions perpendicular thereto. Work-piece holders 10 without a work-piece receiver 11 of this type, however, are also conceivable. In particular pot-shaped work-pieces 1, as that depicted in FIGS. 1 and 2, may be held, for example, in the zone of the pot bottom (bottom part 4, refer to FIGS. 4 and 5). While the work-piece 1 depicted in FIGS. 1 and 2, it is, however, also possible to process differently shaped work-pieces, for example, ones, which are essentially tubular (and do not comprise a bottom part).

The work-piece 1 (or more precisely—in illustrated case with the work-piece receiver 11—the work-piece receiver 11) interacts with the counter-holder 15a, so that the work-piece 1 (and the work-piece holder 10) during the stamping process remains essentially stationary. In order to enable the (intermitting) rotation of the work-piece 1 or to at least simplify it, the counter-holder 15a is in preference moved away from the work-piece 1 between two tool interventions and then brought into contact with the work-piece 1 (symbolised by the double arrow in FIG. 2). In particular in case of sufficiently thick-walled work-pieces 1, counter-holders may be dispensed with.

The apparatus may comprise a drive for the oscillating movement of the tool holder 12, resp., of the stamping tools 21, 22, . . . and a drive for the (possibly intermitting) rotation of the work-piece holder 10 (resp., of the work-piece 1), and in particular may also comprise a synchronisation device for synchronising these movements, wherein this may in particular be an electronic synchronisation device. Furthermore a drive for the tool holder 12 may be provided, by means of which its stamping tools may be brought into the working position, either by a rotating or by a linear or by a different movement. This drive may be a separate drive and may be operationally connected for synchronisation with at least one of the other movements with the synchronisation device. And finally for certain embodiments (refer also to the "second possibility" further down in the description) an additional drive may be provided, by means of which a movement of the work-piece holder parallel to the longitudinal axis may be produced, wherein this linear movement may be synchronised with the work-piece rotation, e.g., by the mentioned synchronisation device.

Figure 3:
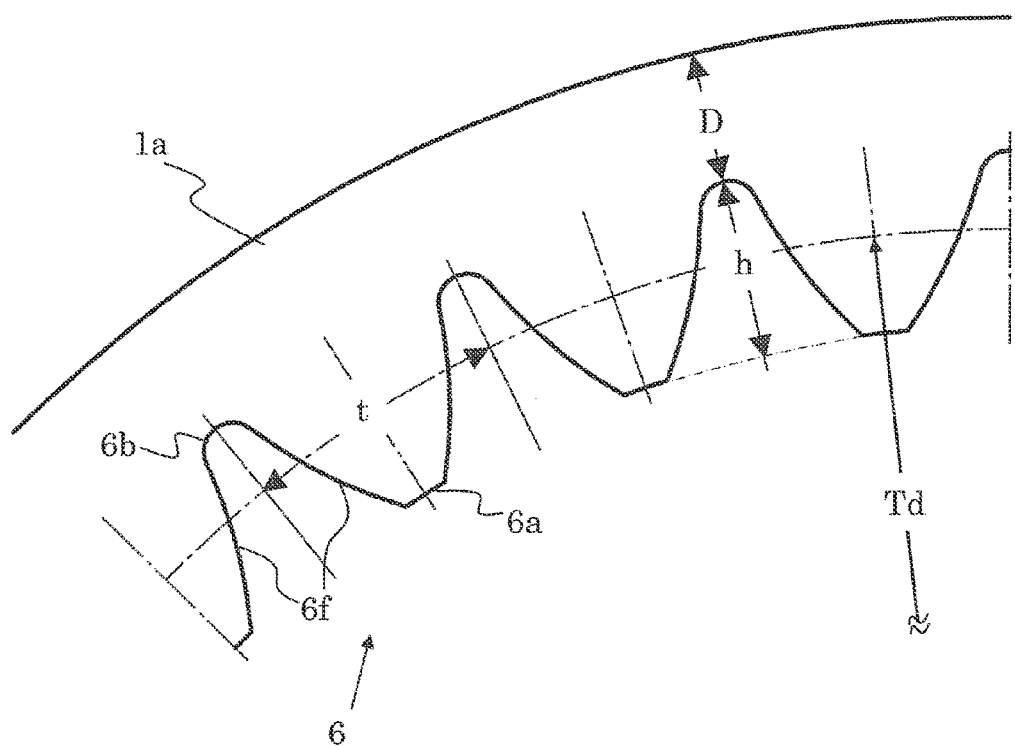
FIG. 3 a detail of a section through a hollow wheel with gear toothing vertical to the longitudinal axis.

FIG. 3 illustrates a detail of a section through a hollow wheel 1a with gear toothing 6 (involute gearing). In preference thick-walled hollow wheels are produced in the described manner, this means that a residual wall thickness D of the hollow wheel 1a has a certain minimum ratio to the gearing depth h of the gearing. The tooth gaps of the gearing 6 comprise tooth heads 6a and tooth bottoms 6b as well as tooth flanks 6f. The Die pitch t and the pitch circle diameter Td are also indicated in FIG. 3.

There are at least two possibilities of producing the tooth gaps. In a first possibility the stamping tools are at least as long as the tooth gaps to be produced (both of course measured parallel to the gearing in the working zone), and the axial coordinate of the work-piece 1 during the implementation of the method remains essentially constant (relative to the stamping tools in the working position). From one tool intervention to the next tool intervention in the same tooth gap (which normally takes place after a complete rotation of the work-piece 1, but possibly also after a half rotation, refer to the double-stroke methods described further below), each one of the tooth gaps becomes deeper and deeper, until finally a desired set-point toothing depth h has been reached.

In a second possibility a stamping tool in the working position has in case of all interventions (possibly apart from an initial—and/or of an end phase) the same feed depth (in case of the last stamping tool corresponding to the pre-defined toothing depth), but with progress of the method the tooth gaps are produced always further along the gearing direction, until finally a pre-defined gearing length has been obtained.

This is achieved by the work-piece, as the method progresses, being moved in the axial direction (in addition to the varying, resp., intermitting rotation) relative to the axial position (z-position) by means of stamping tools in the working position. In the case depicted in FIGS. 1 and 2 therefore, when executing the method in accordance with the second possibility, the work-piece 1 (including the work-piece holder 10) during the method is displaced in z-direction; this may be continuously or in steps. A next stamping tool is only then utilised, when a processing with a previous stamping tool has been completed over the whole gearing length.

With both possibilities the same gearings may be produced. In case of the second possibility, for an optimum result, however, a post-processing may be advantageous. By this a better (less rough) surface is achieved. A calibration of this kind may take place by the method according to the described first possibility. It, is, however, also possible to apply a honing operation for this purpose, by means of honing wheels.

Figure 4:
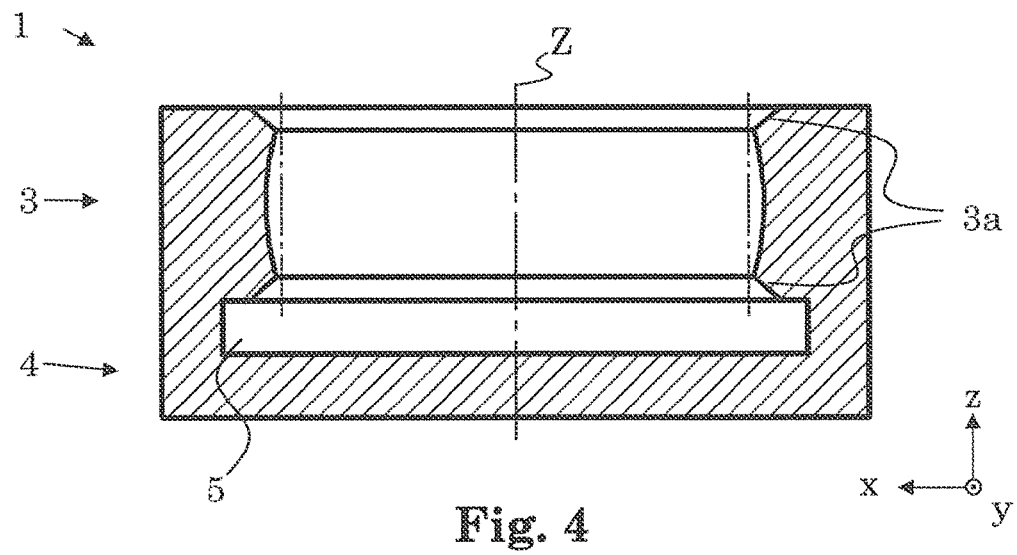
FIG. 4 a work-piece in a section parallel to the longitudinal axis.

FIG. 4 depicts a pot-shaped work-piece 1 in a section through the longitudinal axis Z. Work-piece 1 comprises a tubular section 3 (pot wall) and a bottom part 4 (pot bottom) auf. Die gearing is to be produced in the tubular section 3. If the first possibility described above is utilised, and—as usual—a cylinder gearing is to be produced, then it has proved to be advantageous to make the inside of the tubular section 3 concave, which is depicted excessively strongly exaggerated in FIG. 4. This leads to better results, than if the inside of the tubular section 3 would be cylindrical. Also in case of the second possibility described above such a design of the tubular section 3 may be advantageous. In order to be able to make the gearing correctly, an undercut 5 is provided, which makes it possible to insert at least one stamping tool axially into the tool 1 so far, that the gearing can be produced over the whole required length. Apart from this, at the ends of the tubular section, in which the gear toothing is to be produced, respectively a chamfer 3a is provided.

Figure 5:
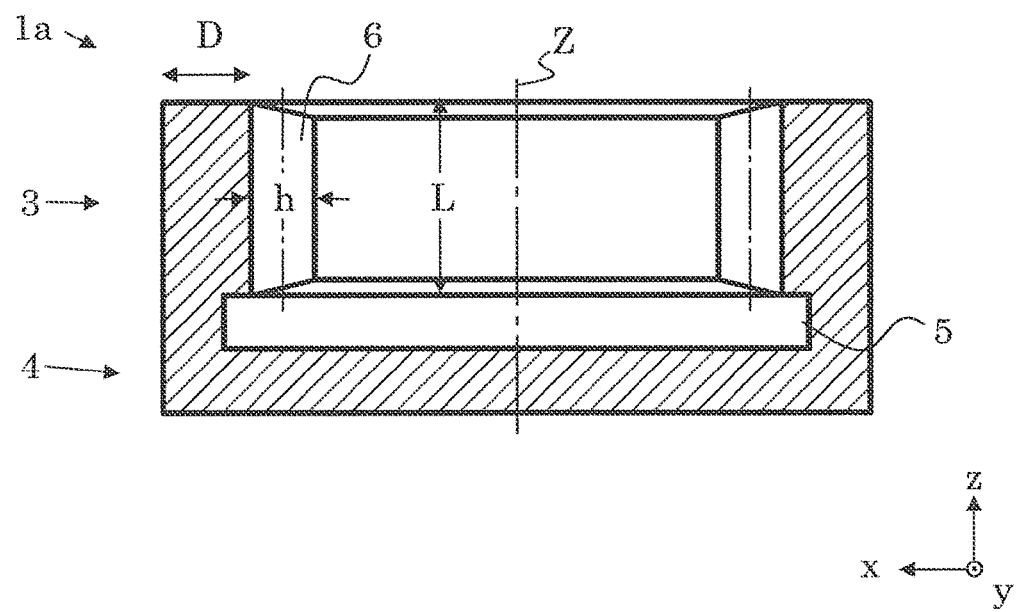
FIG. 5 a hollow wheel with gear toothing manufactured from the work-piece in accordance with FIG. 4, in a section through the longitudinal axis.

FIG. 5 depicts a hollow wheel 1a, produced out of the work-piece 1 in accordance with FIG. 4 according to one of the described possibilities, in a section through the longitudinal axis Z. The gearing 6 has the indicated gearing depth h and the indicated geared length L.

In particular bossed stamping tools may be provided. The bossing may in particular be provided in radial direction.

Figure 6:
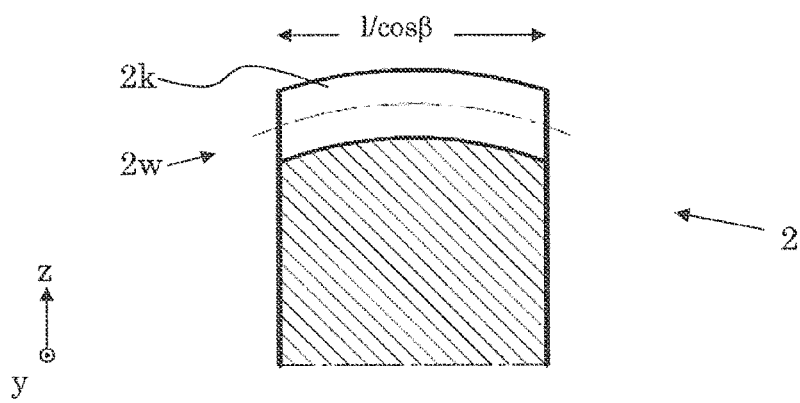
FIG. 6 a bossed stamping tool, in a section along the work-piece tooth, schematically.

FIG. 6 illustrates the bossing in radial direction and schematically illustrates a stamping tool 2 in a section parallel to the gearing (corresponding to a longitudinal section through the stamping tool), as it is advantageously utilised for producing a helical gearing by a method in accordance with the mentioned first and/or second possibility. It has been found that, for achieving good results, it may be advantageous to provide a convex (and thus not straight) formation of the stamping tool 2, in particular, wherein the curvature of the stamping tool 2 at least essentially describes a part of an ellipse, wherein a circle also represents an ellipse. The curvature depicted in FIG. 6 is represented in a vertically exaggerated fashion compared to typical curvatures. The curvature is located in the area of the tool head 2k, which forms a part of the working region 2w.

Indicated above the stamping tool 2 is an extension of the stamping tool 2 parallel to the gearing extent. This is indicated in function of the inclination angle $\beta$ (wherein $\beta=0°$ may apply). As already indicated above, in a method in accordance with the first and possibly also the second possibility, the extent of the at least one stamping tool parallel to the gearing should be greater than the tooth gap length $L/\cos \beta$ of the gearing 6. This is expressed in $1/\cos \beta > L/\cos \beta$, resp., in $l>L$, wherein l indicates the length of the stamping tool parallel to the axis and L the gearing length parallel to the axis in the work-piece.

Figure 7:
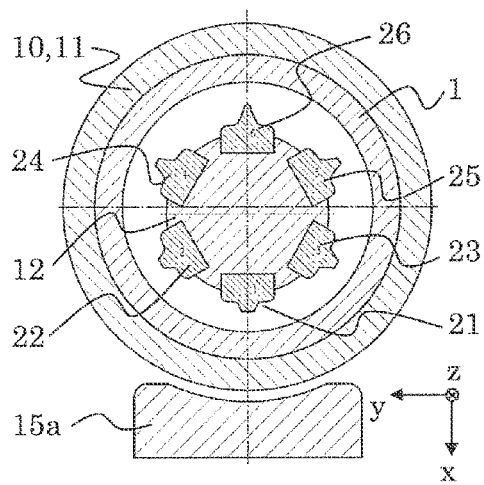
FIG. 7 a detail for illustrating an arrangement with tool receiver, in an initial state, in a section vertical to the longitudinal axis of the work-piece.

FIG. 7 depicts a detail for illustrating an arrangement with tool receiver 11, in an initial state, in a section vertical to the longitudinal axis Z of the work-piece. In this condition the work-piece 1 is still unprocessed, and the counter-holder 15a is not yet in contact with the tool receiver 11.

Figure 8:
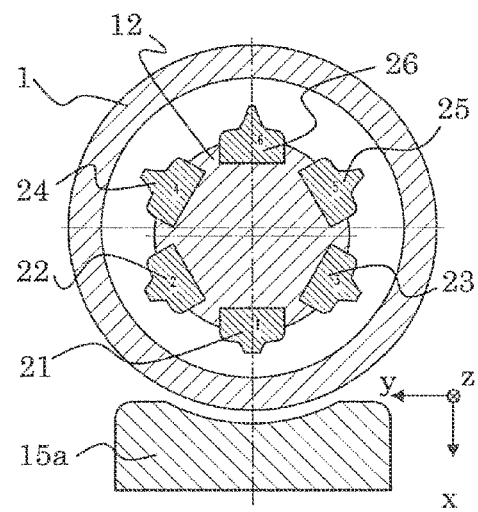
FIG. 8 a detail for illustrating an arrangement without tool receiver, in an initial state, in a section vertical to the longitudinal axis of the work-piece.

FIG. 8 depicts a detail for illustrating an arrangement without a tool receiver, in an initial state, in a section vertical to the longitudinal axis of the work-piece. In this state, the work-piece 1 is still unprocessed, and the work-piece 1 is not yet in contact with the tool receiver 11.

Instead of the six different stamping tools depicted here, also three or four or five or if so required also seven or eight or more may be provided. This depends, e.g., on how deep the gearing shall be, on the material of the work-piece and, at least in the depicted revolver-like arrangement of stamping tools on the tool holder, on geometrical circumstances, in particular on how many stamping tools can be accommodated within the work-piece.

Instead of a revolver-like tool holder equipped with a drum (refer to FIGS. 1, 2), which is rotated to bring stamping tools into the working position, for example, also a tool holder may be provided, which is capable of being linearly (parallel to the axis W) displaced. On a tool holder of this kind, which, for example, comprises a beam-shaped part, stamping tools may also be arranged at different places relative to their longitudinal axis. And a combination of linear and rotating movement for getting the stamping tools into the working position is also possible, wherein then the stamping tools may be arranged on the tool holder distributed over the circumference and relative to their longitudinal axis coordinate.

In the methods and apparatuses described above the stamping tools in the working zone 2w (refer to FIG. 6) have a shape, which corresponds to the shape of a tooth gap to be produced, or to a part thereof, which in the zone of the stamping tool head 2k is shortened.

Figure 9:
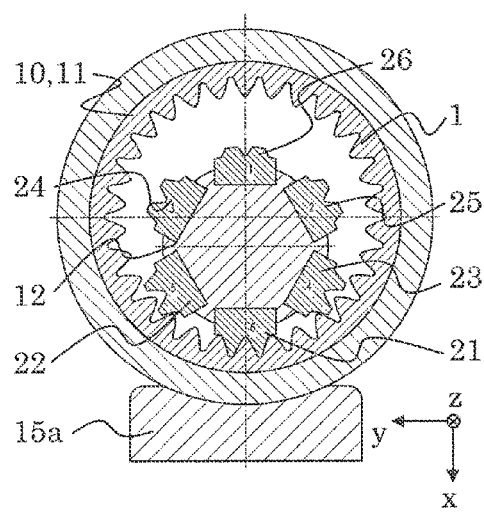
FIG. 9 a schematic illustration of a single stroke method with double toothed stamping tools.

It is, however, also possible, that the shape of the stamping tools in the working zone 2w (refer to FIG. 6) corresponds to the shape of two adjacent tooth gaps to be produced or to a part thereof, which is shortened in the zone of the stamping tool head. FIG. 9 schematically illustrates a corresponding method and a corresponding apparatus.

In FIG. 9 six different double-toothed stamping tools described above are provided, which are utilised one after the other from the shortest (No. 21 in FIG. 9) to the longest (No. 26 in FIG. 9). A utilisation of double-toothed stamping tools may be particularly advantageous, when gearings with particularly long teeth (high gearing) are to be produced and/or when a particularly high precision is to be achieved. In case of double-toothed stamping tools particularly good attention should be paid when designing the tool holder, that stamping tools, which are not in the working position, do not (inadvertently) come into contact with the work-piece 1.

The method with double-toothed stamping tools may otherwise may be implemented in the manner described above. Therein, it is rotated also only by one spacing, so that two successive tooth gaps are processed twice after each other: first by one and then be the other tooth of the stamping tool.

In the method described above at any point in time at most one of the stamping tools is in the working position. And per one period of the oscillating movement precisely one interaction of the stamping tool in the working position with the work-piece 1 takes place. An interaction with the work-piece therefore only takes place with force effect in one and the same direction, in FIGS. 1 and 2 only in the direction of the positive x-axis. A method of this kind therefore may be described as a single stroke method.

Alternatively, however, it is also possible, to have per period of the oscillating movement, two interventions on the work-piece 1 take place by stamping tools in the working position. In this case, which may also be referred to as a double-stroke method, normally two stamping tools are in the working position (while other stamping tools are brought into the working position, temporarily none is in the working position), and this typically in mirror-image positions relative to the axis W. And these two stamping tools arranged opposite one another are typically of the same shape. When therefore a total of N stamping tools are provided, these form M=N/2 pairs of stamping tools of the same shape. In the case of double-stroke methods, pairs of stamping tools come into operation one after the other.

Figure 10:
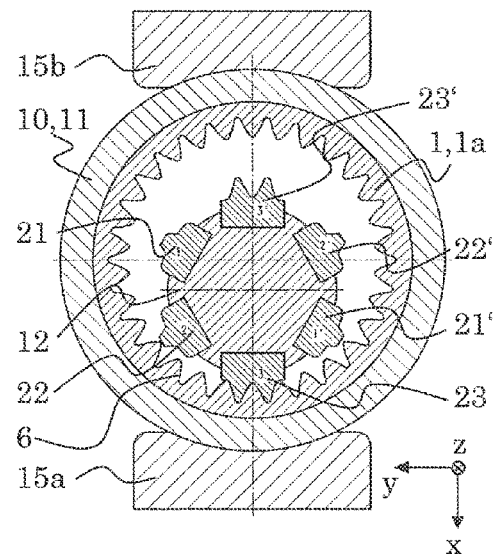
FIG. 10 an illustration of a double stroke method.
Figure 11:
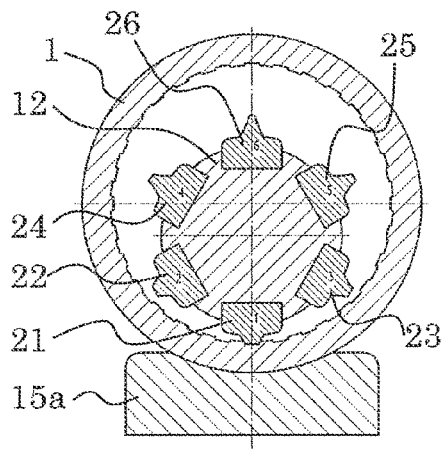
FIGS. 11 to 16 an illustration of the course of a single stroke method with single toothed stamping tools.
Figure 12:
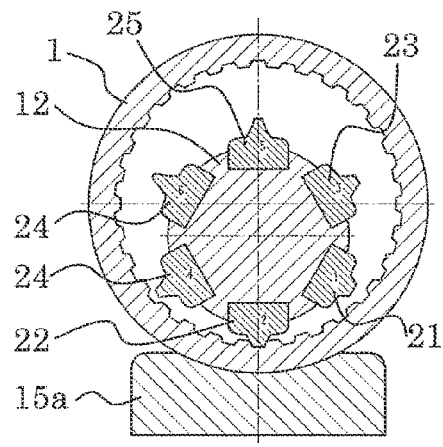
Figure 13:
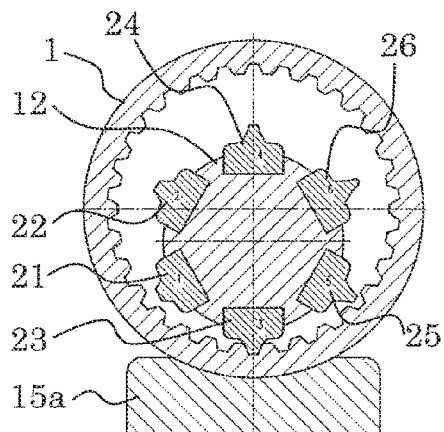
Figure 14:
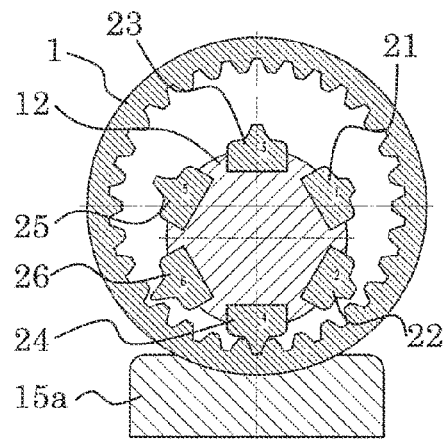
Figure 15:
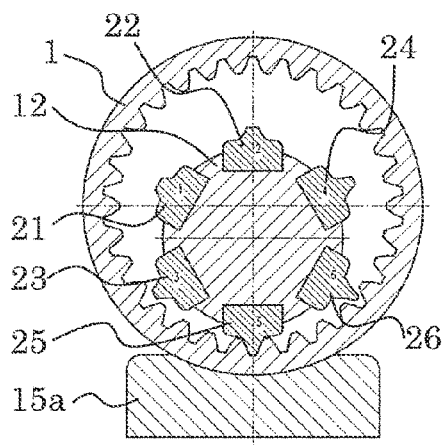

FIG. 10 depicts an example of a corresponding arrangement with M=3. Stamping tools 21 and 21' form such a pair, stamping tools 22 and 22' also, and stamping tools 23 and 23', too. In positive x-direction, in the situation depicted in FIG. 10, stamping tool 23 comes into use, and in negative x-direction stamping tool 23'. In double-stroke methods sensibly two counter-holders 15a, 15b may be utilised, as illustrated in FIG. 1. With double-stroke methods particularly high manufacturing speeds may be achieved.

Furthermore the stamping tools 21, 21', 22, 22' first utilised illustrated in FIG. 10 are single tooth stamping tools (as in FIGS. 1 and 2), and the last utilised stamping tools 23, 23' are double-toothed stamping tools (as in FIG. 9). By the utilisation of a double-toothed stamping tool as last utilised stamping tool, also in the single stroke method an increased precision of the gearing produced may be achieved, also when previously single tooth tools have been utilised.

FIGS. 11 to 16 serve to illustrate the course of a single stroke method with single-toothed stamping tools. After an initial state (refer to FIG. 8), the work-piece is first processed with the stamping tool 21, which comprises the (in the working position radially) shortest working region, see FIG. 11. The location of every tooth to be produced is once or several times processed by stamping by the stamping tool 21, before the changeover to the second stamping tool 22 takes place. Before that, no change of a further one of the stamping tools into the working position takes place. Then the work-piece 1 is processed by stamping tool 22 etc. Thus one after another the always longer stamping tools come into use, until finally, in FIG. 16, the sixth and last stamping tool 26 is utilised.

Figure 16:
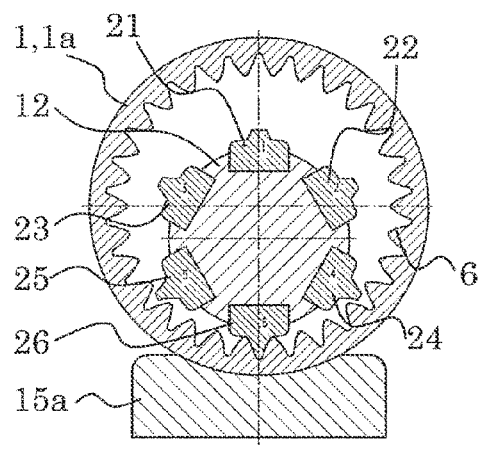

In this manner by a multitude of successive individual stamping steps the gear toothing 6 to be produced comes about, refer to FIG. 16.

Gearinges, for example for motor vehicles, may be produced with the utilisation of the described methods for manufacturing hollow wheels with internal gearing. Such gearings comprise at least one corresponding wheel and benefit from the corresponding advantages.

The invention claimed is:

1. A method for manufacturing a hollow wheel having an internal gear toothing defined by gear teeth that are spaced from one another by a tooth gap, comprising the steps of:
providing a work-piece, said work-piece comprising a tubular section with a longitudinal axis;
providing N stamping tools, wherein N is an integer that is greater than or equal to 2;
processing the work-piece with the stamping tools by bringing each of the stamping tools into a working position to produce the gear toothing on an inside surface of the tubular section;
wherein said processing includes the steps of:
rotating the work-piece about the longitudinal axis at a variable speed, wherein a rotating speed of the work-piece varies over time to produce successive phases of relatively higher rotating speeds and relatively lower rotating speeds, and the processing of the work-piece by the stamping tools takes place during the phases of relatively lower rotating speed;

moving at least one of said N stamping tools, which is in the working position, radially toward and away from the inside surface of the tubular section so that said at least one stamping tool in the working position repeatedly processes the work-piece, wherein said at least one stamping tool engages the inside of the tubular section when said work-piece is at the relatively lower rotary speed.

2. The method according to claim 1, wherein at least two of the N stamping tools comprise differently shaped working regions.

3. The method according to claim 2, wherein the differently shaped working regions of the stamping tools differ with respect to a length in a radial direction, measured in the working position.

4. The method according to claim 3, wherein a time sequence, in which the stamping tools are brought into the working position, is given by the sequence whereby such that a shortest tool is used first, and a longest tool is used last.

5. The method according to claim 2, wherein:
   each of the N stamping tools comprises a differently shaped working region; or
   M is an integer that is greater than or equal to 2 and N=2M, and the N stamping tools form M pairs of stamping tools with essentially identically shaped working regions, and the working regions of different ones of the M pairs of N stamping tools are differently shaped.

6. The method according to claim 1, wherein the N stamping tools are held by a tool holder, by means of which the stamping tools are brought into the working position.

7. The method according to claim 6, wherein the tool holder comprises a drum, and the stamping tools are arranged on a circumference of the drum.

8. The method according to claim 1, wherein at least one of the N stamping tools comprises a working region, the tooth profile of said working region essentially corresponds to a profile of two adjacent tooth gaps of the gear toothing to be produced.

9. The method in accordance with claim 1, wherein said relatively lower rotating speed is one at which the work-piece at least momentarily stands still.

10. The method according to claim 1, wherein either
   c) the method comprises initially bringing a first one of the N stamping tools into the working position and then bringing, one after the other, the further N stamping tools, up to the N-th stamping tool, into the working position, wherein each of the N stamping tools remains in the working position at least until every tooth gap in creation of the gear toothing to be produced has been processed at least once by the respective stamping tool respectively in the working position;
   or
   d) M is an integer with N=2M, and the N stamping tools form M pairs of stamping tools with essentially identically shaped working regions, and wherein the method comprises bringing a first pair of the M pairs of stamping tools is brought into the working position and then bringing, one after the other, the further ones of the M pairs of stamping tools, up to the M-th pair of the stamping tools, into the working position, wherein each of the M pairs remains in the working position at least until every tooth gap in creation of the gear toothing to be produced has been processed at least once by at least one of the two stamping tools in the working position of the respective pair of stamping tools.

11. The method according to claim 10, wherein each of the N stamping tools remains in the working position at least until each of the tooth gaps in creation of the gear toothing to be produced has been processed at least twice by the respective stamping tool respectively in the working position.

12. The method according to claim 10, wherein all of the N stamping tools comprise differently shaped working regions.

13. The method according to claim 10, where each of the M pairs remains in the working position at least until every tooth gap in creation of the gear toothing to be produced has been processed at least once by both of the two stamping tools in the working position of the respective pair of stamping tools.

14. The method according to claim 10, wherein the M pairs of stamping tools comprise differently shaped working regions, and the tooth profile of the working regions essentially corresponds to a profile of two adjacent tooth gaps of the gear toothing to be produced.

15. The method according to claim 1, wherein
   N is greater than or equal to 4, and all of the N stamping tools comprise differently shaped working regions; or
   M is greater than or equal to 3 and is an integer with N=2M, and the N stamping tools form M pairs of stamping tools with essentially identically shaped working regions.

16. The method according to claim 1, wherein the hollow wheel is pot-shaped with a bottom part adjoining the tubular section.

17. The method according to claim 1, comprising the steps of rotating the work-piece a multitude of rotations and repeatedly processing the work-piece by the stamping tools to produce deeper and deeper shaping of the tooth gaps of the gear toothing until a predefined gearing depth and shape of the gear toothing is achieved.

18. The method according to claim 1, wherein each of the N stamping tools in a direction of the tooth gaps is longer than tooth gaps of the gear toothing to be produced.

19. The method according to claim 1, wherein each of the stamping tools comprises at least one working region, which comprises a tool head and tool flanks, and wherein a tool head of at least one of the stamping tools is convex shaped.

20. An apparatus for producing hollow wheels equipped with an internal gear toothing, comprising
   a work-piece holder that is rotatable around a longitudinal axis of the work-piece holder for holding a work-piece with a tubular section aligned along the longitudinal axis such that an inside of the tubular section can be accessed and processed;
   a drive for rotating the work-piece holder, said drive being configured to rotate the work-piece holder at a rotation speed varying over time:
   a tool a tool holder for holding N stamping tools, where N is greater than or equal to 2, by means of which each one of the N stamping tools may be brought into a working position, and which can be driven for accomplishing a linearly oscillating movement in a direction extending radially relative to the longitudinal axis to move the stamping tools toward and away from the inside of the tubular section such that an inside surface of the tubular section can be repeatedly processed by a stamping tool in the working position; and,
   a synchronisation device for synchronizing rotation of the work-piece holder with the linear oscillating movement of the tool holder.

21. The apparatus according to claim 20, wherein the drive is configured to vary the rotating speed of the work-piece over time to produce successive phases of relatively higher rotating speeds and relatively lower rotating speeds, and the synchronization device is configured such that processing of the work-piece by the stamping tools takes place during the phases of relatively lower rotating speed.

22. The apparatus according to claim 20, said apparatus comprising at least two stamping tools, wherein the at least two stamping tools are held in the tool holder and comprise differently shaped working regions.

* * * * *